(12) United States Patent
Antoniades

(10) Patent No.: US 11,636,167 B2
(45) Date of Patent: Apr. 25, 2023

(54) DETERMINING SIMILARITY BETWEEN DOCUMENTS

(71) Applicant: SERENDIPITY AI LIMITED, London (GB)

(72) Inventor: Andreas Antoniades, Guildford (GB)

(73) Assignee: SERENDIPITY AI LIMITED, London (GB)

( * ) Notice: Subject to any disclaimer, the term of this patent is extended or adjusted under 35 U.S.C. 154(b) by 0 days.

(21) Appl. No.: 17/619,664

(22) PCT Filed: Jun. 26, 2020

(86) PCT No.: PCT/GB2020/051554
§ 371 (c)(1),
(2) Date: Dec. 16, 2021

(87) PCT Pub. No.: WO2020/260894
PCT Pub. Date: Dec. 30, 2020

(65) Prior Publication Data
US 2022/0309116 A1 Sep. 29, 2022

(30) Foreign Application Priority Data

Jun. 27, 2019 (GB) .................................. 1909252

(51) Int. Cl.
*G06F 16/93* (2019.01)
*G06F 16/9535* (2019.01)
*G06F 40/279* (2020.01)

(52) U.S. Cl.
CPC .......... *G06F 16/9535* (2019.01); *G06F 16/93* (2019.01); *G06F 40/279* (2020.01)

(58) Field of Classification Search
CPC ............. G06F 16/9535; G06F 16/9536; G06F 16/9538; G06F 16/93; G06F 40/279
See application file for complete search history.

(56) References Cited

U.S. PATENT DOCUMENTS 6,720,564 B1 * 4/2004 Koch .................... A61B 5/1172
850/10
9,141,676 B2 * 9/2015 Lysne ..................... G06F 17/16
(Continued)

OTHER PUBLICATIONS

Oct. 14, 2019—(GB) Search Report—App No. 1909252.7.
(Continued)

*Primary Examiner* — Merilyn P Nguyen
(74) *Attorney, Agent, or Firm* — Banner & Witcoff, Ltd.

(57) ABSTRACT

Method and system for processing digital works, the method comprising the steps of identifying terms within each digital work of a plurality of digital works, wherein the terms are words and/or phrases. Determining a number of times that the identified terms occur within each digital work of the plurality of digital works. Generating a fingerprint for each digital work of the plurality of digital works, the generated fingerprint based on the identified terms and the number of times that the identified terms occur within each digital work. Using a neural network to find an encoding function, g, that encodes a higher dimensionality space, x, of each fingerprint into a lower dimensionality space, y. Applying the encoding function to each fingerprint of the plurality of digital works to reduce their dimensionality. Determining a similarity between a first fingerprint and one or more dimensionality reduced fingerprints.

16 Claims, 7 Drawing Sheets

(56) References Cited

U.S. PATENT DOCUMENTS

| | | | |
|---|---|---|---|
| 2006/0259481 A1 | 11/2006 | Handley | |
| 2011/0225159 A1 | 9/2011 | Murray | |
| 2013/0275421 A1* | 10/2013 | Resch | G10L 25/48 707/725 |
| 2014/0038639 A1* | 2/2014 | Shi | H04W 64/00 455/456.1 |
| 2014/0330556 A1* | 11/2014 | Resch | G10L 19/00 704/221 |
| 2015/0074027 A1* | 3/2015 | Huang | G06F 16/951 706/46 |
| 2016/0352765 A1* | 12/2016 | Mermoud | H04L 63/1458 |
| 2017/0124447 A1 | 5/2017 | Chang et al. | |
| 2020/0074169 A1* | 3/2020 | Mukhopadhyay | G06V 30/413 |
| 2020/0382308 A1* | 12/2020 | Enrico | G06F 21/602 |
| 2021/0157577 A1* | 5/2021 | Sobran | G06F 8/75 |
| 2022/0300528 A1* | 9/2022 | Reymond | G06F 16/26 |

OTHER PUBLICATIONS

Aug. 25, 2020—(WO) ISR & WO—App. No. PCT/GB2020/051554.

Slot, "Information Retrieval with Dimensionality Reduction using Deep Belief Networks," Master Thesis, Department of Artificial Intelligence, University of Groningen (Apr. 2016); retrieved from https://www.ai.rug.nl/~mwiering/Thesis_Vincent_Slot.pdf on Aug. 14, 2020.

Dhand, "Efficient semantic indexing via neural networks with dynamic supervised feedback," TREC Conference 2015, pp. 1-8 (2015).

* cited by examiner

DETERMINING SIMILARITY BETWEEN DOCUMENTS

CROSS-REFERENCE TO RELATED APPLICATIONS

This application is a U.S. National Stage application under 35 U.S.C. § 371 of International Application PCT/GB2020/051554, filed Jun. 26, 2020, which claims the benefit of priority to United Kingdom Patent Application GB 1909252.7 filed Jun. 27, 2019. Benefit of the filing date of each of these prior applications is hereby claimed. Each of these prior applications is hereby incorporated by reference in its entirety.

FIELD OF THE INVENTION

The present invention relates to computer implemented methods, apparatus, a server and computer readable media for processing digital works and in particular, for providing a user with recommendations of digital content similar to provided content.

BACKGROUND OF THE INVENTION

In the area of digital content recommendation, it is desirable for a user consuming particular digital works and content to receive suggestions for other similar content. Existing methods and systems provide recommendations of digital content to one or more users. These recommendations may be suggested based on a particular user's search terms, activity and preferences. A common practise involves the use of social graphs and the association of the user with other known users and their profiles. This can be seen to some extent in U.S. Pat. Nos. 9,720,978 and 8,326,861. One problem with these existing methods is that recommendations are often uninteresting, irrelevant or of little value to users. One reason for this is that it is also difficult to compare different types of digital works (e.g. having different lengths) and so digital works that may be suggested to a user may miss some closer matches or more relevant results. Alternative methods follow a more qualitative approach where only the user's search criteria and the target content is taken into account and compared with descriptors of the content. However, these other methods are often unable to provide high quality recommendations in a timely manner, due to the computational complexity required in order to analyse a high volume content with the intended granularity. In other words, existing techniques cannot provide particularly relevant results to a search for different types of documents or digital works in general without requiring very large computing resources and/or long processing times.

Therefore, there is required a method and system that overcomes these problems.

SUMMARY OF THE INVENTION

Digital summaries, representations or digests (fingerprints) are obtained from digital works. These fingerprints are based on terms (words or phrases within text of the digital works) and the number or times that each term appears in the digital work. The dimensionality of each fingerprint is reduced using a mathematical function (e.g. a model). This mathematical function may be determined in advance using a neural network to implement artificial intelligence or machine learning techniques. The neural network may be trained using a plurality of digital works to build and enhance the function. The obtained function is used to encode one or more fingerprints of further digital works or to encode the fingerprints of new digital works as they are received. A query may be converted to a fingerprint, which is encoded with the mathematical function to reduce its dimensionality. Digital works are compared with the fingerprint (that originated from the query) to determine how similar they are based on the dimensionality reduced fingerprints. Response to queries may be made based on providing digital works having similar fingerprints. For example, a user may provide a single digital work (either new or already processed) and digital works having similar fingerprints may be retrieved. Alternatively, a user may provide particular terms and digital works having those terms in their fingerprints may be retrieved and provided in response to the query. US2003/0033300 describes various techniques for dimensionality reduction that may be used.

In accordance with a first aspect there is provided a method (i.e. a computer implemented method) for processing digital works, the method comprising the steps of:

identifying terms within each digital work of a plurality of digital works, wherein the terms are words and/or phrases;

determining a number of times that the identified terms occur within each digital work of the plurality of digital works;

generating a fingerprint for each digital work of the plurality of digital works, the generated fingerprint based on the identified terms and the number of times that the identified terms occur within each digital work;

using a neural network to find an encoding function, g, that encodes a higher dimensionality space, x, of each fingerprint into a lower dimensionality space, y;

applying the encoding function to each fingerprint of the plurality of digital works to reduce their dimensionality; and determining a similarity between a first fingerprint and one or more dimensionality reduced fingerprints. Therefore, more relevant digital works may be retrieved more effectively and efficiently. This method may be used to group different digital works having the same or similar fingerprints. Alternatively, a fingerprint may be selected, formed of generated in isolation (i.e. not originating from a digital work). Other fingerprints (e.g. within repository or database) may be compared against this generated fingerprint in order to find digital works that match the generated fingerprint.

Optionally, the method may further comprise the step of generating an output of data indicating digital works having fingerprints with a similarity to the first dimensionality reduced fingerprint exceeding a threshold. The threshold may be predetermined, for example. The output may be links or pointers to the digital works or the digital works themselves.

Preferably, the output may be generated in response to receiving a query. The query may be provided by a user interface.

Optionally, the query may include one or more terms included in the similar fingerprints. The query may take other forms. Therefore, this query may be the source of the fingerprint that is compared with other fingerprints that originated from digital works.

Preferably, the query may include one or more terms and the first fingerprint is formed from the query. Therefore, the fingerprints (e.g. already processed and within a repository or database) can be compared with a fingerprint derived from a query, a new or separate document or another source.

Preferably, the method may further comprise the step of receiving from a user the query formed from a selection of the one or more terms. They may be entered as free text or from predetermined options.

Optionally, the similarity may be based on a co-occurrence of terms within the dimensionally reduced fingerprints.

Optionally, the method may further comprise the steps:
of receiving a new digital work; and
adding the new digital work to the plurality of digital works. The digital works may be added on demand or the method may search for digital works to process and form a repository of fingerprints and associated links or locations of the digital works, for example.

Optionally, the encoding function, g, is found according to the function:

$$g: x \rightarrow y$$

by estimating an original higher dimensionality space, $\hat{x}$, by inverting the function, g, according to:

$$g^{-1}: y \rightarrow \hat{x}.$$

Other mathematical functions or models may be used.

Optionally, the method may further comprise the step of storing the plurality fingerprints and data identifying associated digital works in a repository.

Optionally, the similarity between two or more dimensionality reduced fingerprints may be determined based on a scoring function.

Preferably, the scoring function, sim(.), is:

$$sim(f1, f2) = \sum^{|f1 \cap f2|} \frac{f1_i}{\sum_{k=1}^{N} f1_k} \frac{f2_j}{\sum_{k=1}^{N} f2_k} \ \forall \ i \equiv j \quad (3)$$

where f1 and f2 are dimensionality reduced fingerprints to compare and i and j are terms within the dimensionality reduced fingerprints. Other scoring functions may be used. an expectation of a score between the two terms, i and j is evaluated according to:

$$E[f1_i, f2_j] = \begin{cases} \text{if } i \equiv j \rightarrow \frac{f1_i}{\sum_{k=1}^{N} f1_k} \frac{f2_j}{\sum_{k=1}^{N} f2_k} \\ \text{otherwise} \rightarrow 0 \end{cases} \quad (4)$$

This allows fingerprints to be compared with different terms. A score is only generated for common terms amongst fingerprints. Otherwise, a zero score is provided. This reduces the use of computing resources.

Optionally, the method may further comprise the step of sorting fingerprint recommendations by their respective similarity values, computed by the scoring function. This may improve efficiency and speed.

Optionally, identifying terms within each digital work may further comprise identifying terms based on a look up table or a dictionary or by tagging terms previous identified in previous processing. Other techniques of identifying terms may be used.

Optionally, the method may further comprise the step of limiting the number of identified terms in each digital work.

Preferably, the limited number of identified terms may be a predetermined limit. This may be varied or fixed.

Optionally, the digital works may be any one or more of: text, documents, web pages, articles, news stories, books, newspaper content, social media content, and/or publications. Other types may be used and processed.

In accordance with a second aspect, there is provided a data processing apparatus comprising a processor adapted to perform the steps of any of the above methods.

In accordance with a third aspect, there is provided a computer program comprising instructions, which when executed by a computer, cause the computer to carry out any of the above methods.

In accordance with a fourth aspect, there is provided a computer-readable medium comprising instructions, which when executed by a computer, cause the computer to carry out the any of the above methods.

The methods described above may be implemented as a computer program comprising program instructions to operate a computer. The computer program may be stored on a computer-readable medium.

The computer system may include a processor or processors (e.g. local, virtual or cloud-based) such as a Central Processing unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX®, Windows® or Linux®, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
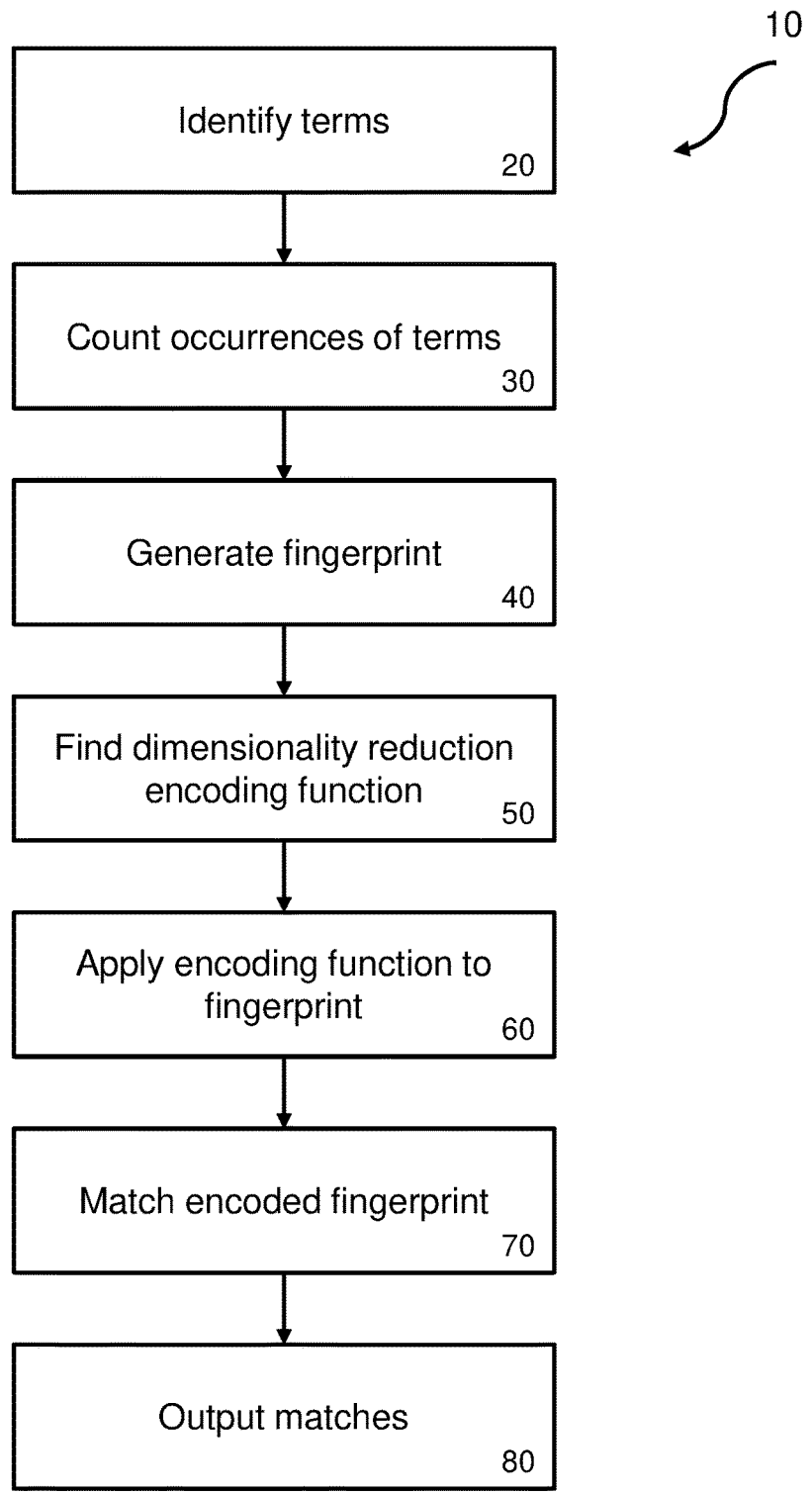
FIG. 1 shows a flowchart of a method for processing digital works including steps of generating fingerprints of the digital works and dimensionality reduction of the fingerprints.

The method involves identifying and retrieving digital patterns, based on a similar querying pattern, that can be user or machine generated. The method may be implemented on a computer system, network or virtual server. The machine generated patterns/fingerprints may be constructed by aggregating data from different sources and transformed to sparse distributed representations of the highest occurring terms (e.g. words or phrases). A fingerprint may be described as a collection of terms that defines particular properties of a digital work, wherein these properties are exhibited throughout the digital work. In one example implementation, these terms are stored in a lookup table along with their occurrences (i.e. the number of times that each term appears in the digital work). Other storage formats may be used for the fingerprints. The term list can be expanded with terms identified in previous processing. A fingerprint may be generated either through an automatic process from a digital work or it can be manually created by a user who can select terms from a list of available terms. In this case, the fingerprint may be used within a search query to find digital works that have matching fingerprints (e.g. exactly or within a tolerance). Therefore, a fingerprint is not necessarily unique but can be shared by different digital works.

The method includes a dimensionality reduction engine 102 that performs a non-linear mapping of the terms to a lower dimensional representation. Dimensionality reduction is achieved through the use of a neural network that minimises the number of dimensions required to represent the data, while ensuring that essential information is preserved. The method includes a similarity engine 104 that operates by computing a qualitative similarity score between the query and the available patterns based on the normalised co-occurrence of terms embedded in the lower dimension representations. The method ranks qualifying patterns based on a similarity score and retrieves the top matching patterns based on a threshold, for example.

Aggregating potential patterns over large data sets leads to a very high number of observed patterns. Finding similar patterns for new data can be cumbersome with a large corpus of historic patterns. In other words, given a large enough corpus of historic patterns to compare against, the timely retrieval of similar patterns may entail an impractical computational cost.

In text based applications, patterns can be observed at an abstract content level, with an individual term level and at all levels in-between. Depending on the intended granularity, thousands of patterns can emerge from a single piece of digital content. Such applications may involve hashes based on term analysis, which often do not best describe the original content. One advantage of the present system and method is that it provides a universal process to efficiently retrieve patterns that can be generalised for digital content based applications. This provides additional value by consolidating dimensionality reduction techniques based on artificial intelligence and an optimal similarity engine, ensuring the retrieval of similar patterns in a timely manner. This may occur even if the patterns are not directly mentioned in text.

FIG. 1 shows a flowchart of a method 10 for processing digital works. Each digital work contains text that includes words or phrases forming terms. At step 20, individual terms are identified and at step 30, the occurrences of these terms within the document are counted. A fingerprint for the particular digital work being processed is generated at step 40 and this fingerprint is based on the terms that are identified and their occurrence value throughout the document. This results in a high dimensionality fingerprint as there will generally be many terms, especially for large documents. At step 50, a dimensionality reduction encoding function is obtained. This may be achieved by processing a number of digital works using a neural network using machine learning techniques. The encoding function may be found by processing a subset of digital works or the encoding function may be developed over time as digital works are processed.

At step 60, the encoding function is applied to the fingerprint of the digital work to reduce its dimensionality. There may be a repository of fingerprints having reduced dimensionality generated in a similar way and according to the method 10. At step 70, similar fingerprints within the repository may be matched and step 80 provides an output of the matches so that digital works having similar fingerprints and therefore similar content may be provided.

There may be a threshold applied to the matches so that only the best matches are output, which reduce the number of documents provided to only those most relevant digital works. Alternatively or additionally, matches may be limited to a particular or predetermined number of matches.

Figure 2:
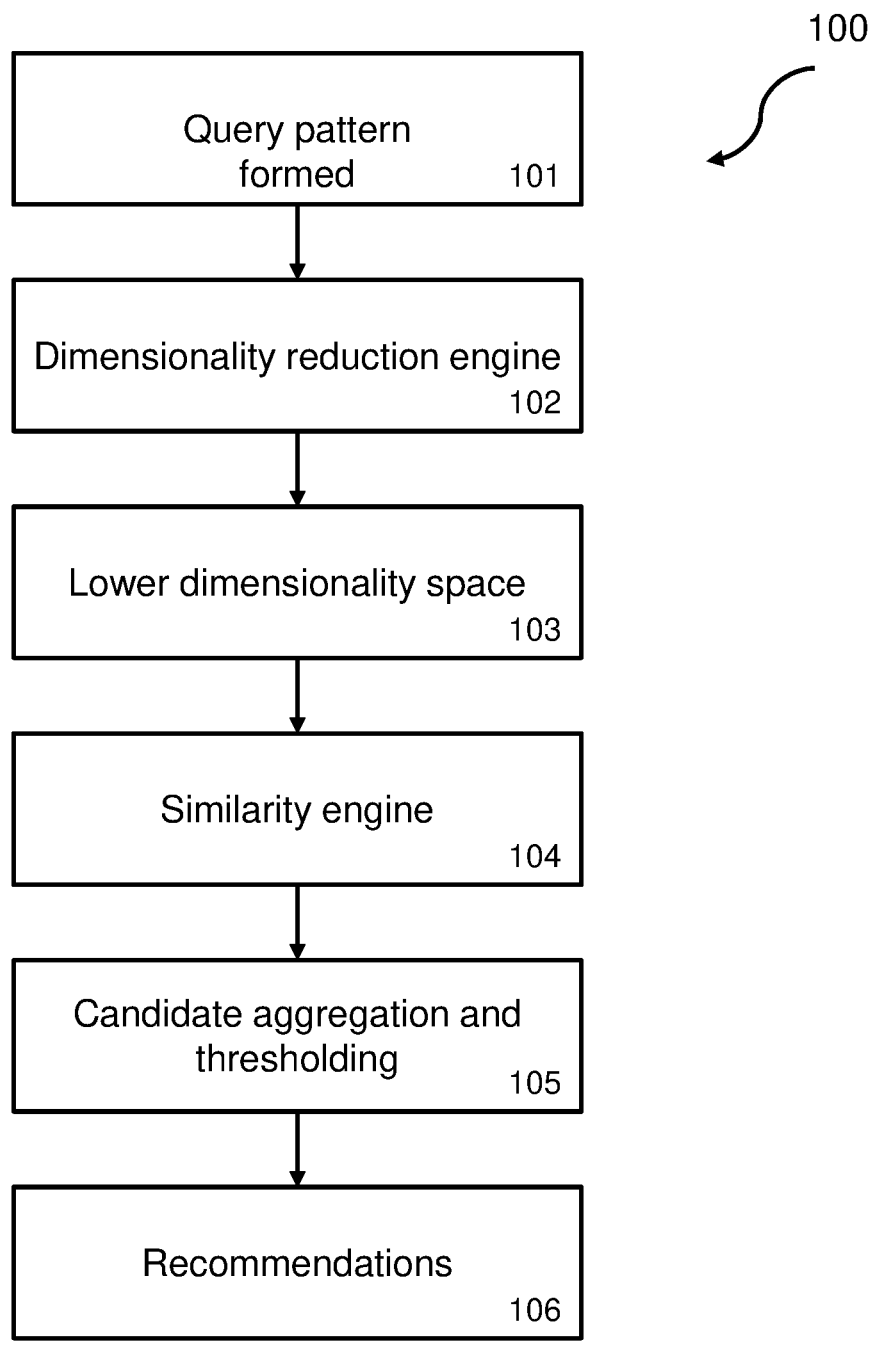
FIG. 2 shows a flowchart of a further method for processing digital works.

The system therefore recommends digital works based on fingerprints of tangible and intangible entities that result from machine learning techniques and aggregation of structured/unstructured text. This in turn may be based on a query fingerprint generated using the same or a similar process (e.g. to find digital works based on a single digital work) or by a query of terms manually constructed by a user. In an example implementation, the system and method may assign a newly generated fingerprint (or digital work) to a more generalised/abstract fingerprint from a predetermined set of fingerprints (e.g. having a similar theme). Similarity comparisons are preceded by the dimensionality reduction engine 102, where a fingerprint pattern is compacted in a lower dimensional space. The system output may comprise recommendations of the most relevant entities to the newly generated fingerprint by means of a similarity scoring function. An overview of this particular example fingerprint recommendation system and method 100 is depicted in FIG. 2. Although the methodology of the invention is comprehensively detailed herein, the invention can be implemented in a number of computer systems and invoked in a number of different ways.

The method 100 of FIG. 2 commences with a user entering or otherwise devising a query pattern 101. This may be based on a selection or input of specific terms or formed from a user asking for digital works similar to a particular selected digital work (that itself may be fingerprinted to form the query). However devised, this query pattern takes the form of a fingerprint, which passes through a dimensionality reduction engine at step 102 placing the fingerprint within a lower dimensionality space at step 103. Fingerprints for pre-processed digital works may already be within this lower dimensionality space and so step 104 causes the similarity engine to find similar fingerprints within this space. Matches that are found between the query pattern and fingerprints of known or pre-processed digital works form a set of candidate matches. These candidate matches are aggregated and filtered by applying a threshold at step 105. A response to the query takes the form of recommendations, which are output at step 106.

Figure 3:
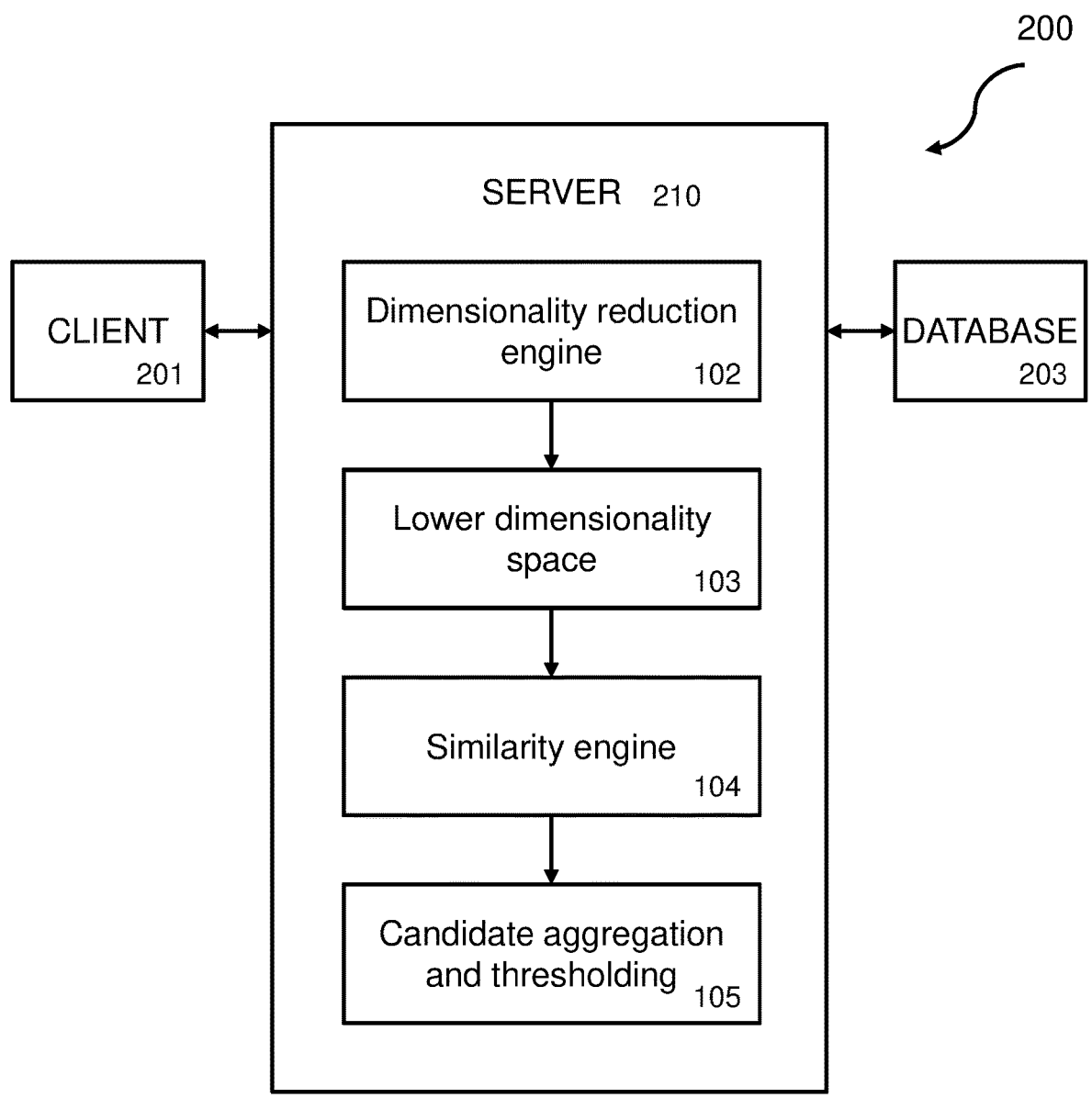
FIG. 3 show a schematic diagram of a system for processing digital works.

A schematic diagram of one such example implementation system 200 is shown in FIG. 3. FIG. 3 shows a client 201 that can connect to a server 210 that hosts the dimensionality reduction engine 102, the lower dimension space 103 (e.g. stored or cached in memory) and similarity engine 104. The candidate aggregation and thresholding process 105 also resides within the server 210. Database 203 provides a store of fingerprints and either references their associated digital works or the digital works themselves. A user (e.g. an application or computer program operated by the user) sends a query pattern 101 to the server 210, which processes this query using the steps described with reference to FIG. 2 to find and rank relevant patterns by similarity. The server 210 requests the top relevant patterns from the database 203 based on a qualitative threshold, or other limitation.

The process may be abstracted or summarised as follows:
1. Receive the digital content (or selection of terms forming a query);
2. Determine a fingerprint for the digital content;
3. Perform dimensionality reduction to reduce the data space;
4. Compare the determined fingerprint against a repository of pre-processed digital content and calculate the similarity score; and
5. Provide a list of the closest candidates from that comparison based on the similarity score and a numerical similarity threshold.

An example implementation may come in the form of a news article classifier. Given a specific news article (e.g. one chosen by the user), the user can be presented with other articles relevant to the one being read. Additionally, the fingerprint recommendation system can be used to associate the article to entities, whose fingerprints are relevant to the digital content, even if the entities were not directly mentioned in the article. For example, an article about improvements to city waste management can be associated with cities that struggle with the subject, without those cities being directly mentioned in the article.

The system receives the digital works or content before processing can commence. The digital content can be hosted on the web, the user's computer or on a digital storage medium, for example and it may be passed to the fingerprint recommendation system 200.

The system 200 parses the digital content and identifies prominent terms either using a look up dictionary of terms of interest or by tagging terms that were deemed important in previously generated fingerprints. In this way, the number of terms processed may be limited but this set of terms may evolve with new terms added over time, for example. A single term may be found within the digital works in several different forms. For example, some terms may include titles, middle names, singular and plural forms. A de-duplication algorithm is preferably employed to map different surface forms into a single term to avoid duplication. Additionally a hard limit (t) may be set, such that if the occurrence of a term is lower than t, then that term is not considered as part of the fingerprint. Fingerprints can be sorted by the number of mentions relative to the total number of mentions for all terms in the fingerprint, for example. For larger or diverse documents a limit of terms per fingerprint may also be applied to increase the specificity of the fingerprint. A user may also be able to generate a custom query (i.e. fingerprint) by selecting from a list of prominent terms that were observed in the past and adjusting the importance of each term so that more important terms have a higher or weighted 'occurrence' value.

Due to the high dimensionality of the term space (patterns may be a subset of this term space), an intermediary dimensionality reduction engine 102 is use to improve the performance of the system 200. The dimensionality reduction engine 102 is comprised of an artificial neural network that encodes the high dimensionality space (x) into a lower dimensionality space (y), by implementing a similarity engine score described below.

The neural network can be used to implement a squashing function where the output, y, is generated through non-linear combinations of the input, x. The original space is $\hat{x}$ and the model may be trained such that the distance between input x and $\hat{x}$ is minimised:

$$x - \hat{x} \to 0 \quad (1)$$

Once converged, an encoding function, g, may be used to reduce the dimensionality of all new inputs:

$$g: x \to y \quad (2)$$

An estimate of the original space $\hat{x}$ is determined by inverting the function according to:

$$g^{-1}: y \to \hat{x} \quad (3)$$

Another way to describe this is that when both g and $g^{-1}$ are applied, the result should be similar to the original input, x, as shown by:

$$\hat{x}: g^{-1}(g(x)) \approx x \quad (4)$$

Figure 4:
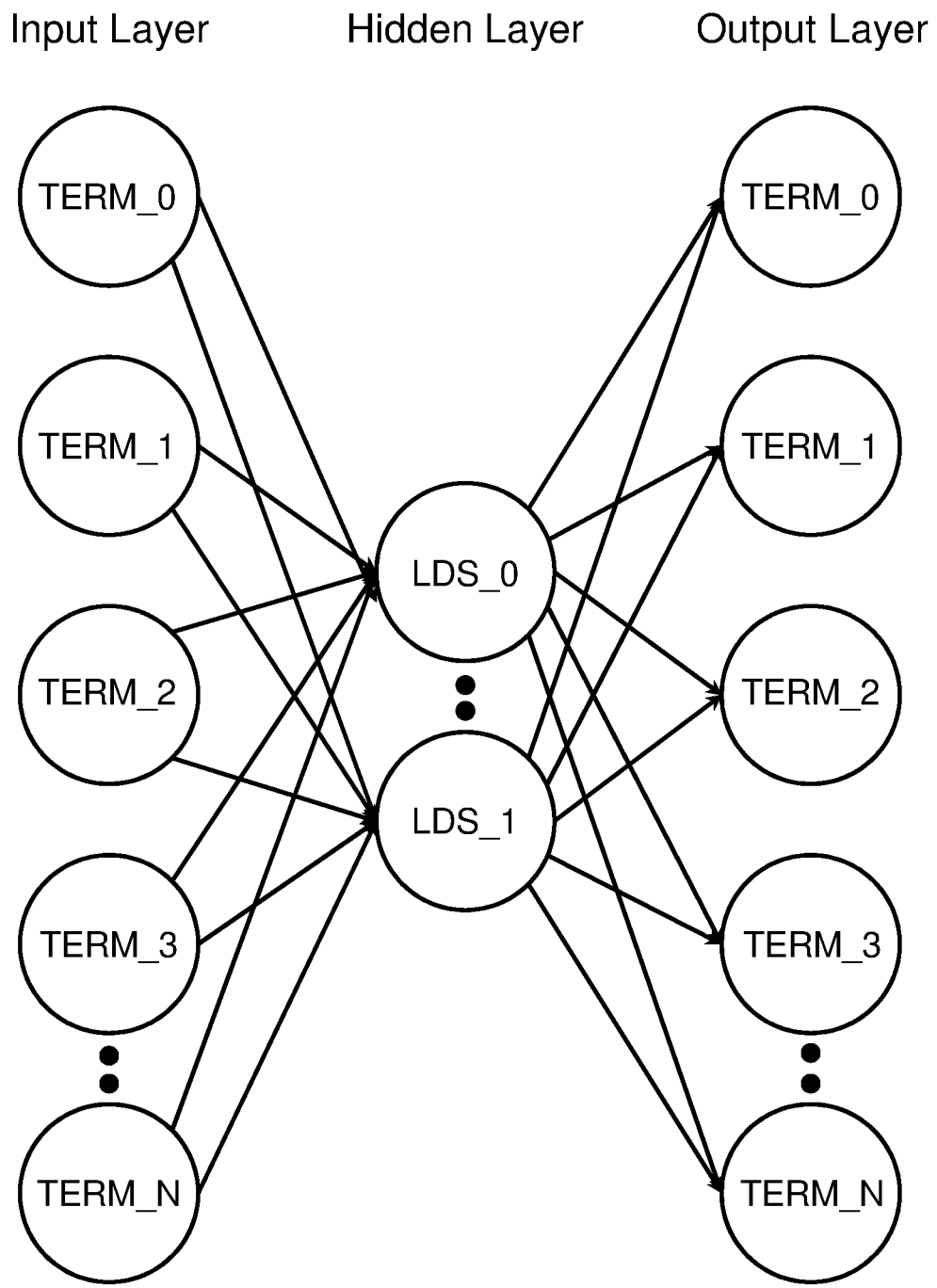
FIG. 4 shows a schematic diagram of the step of dimensionality reduction of FIG. 1.

FIG. 4 depicts one example implementation of the neural network operating to reduce the dimensionality of fingerprints, although the optimal solution may consist of more than one hidden layer. The number of features on a lower dimensionality space (LDS) may be contingent on the volume of data and degree of dimensionality of the original space. In an example implementation, the neural network may be a denoising stacked autoencoder implemented in the Python® programming language. However, other neural networks may be used.

A scoring function is applied to fingerprints in a variable multidimensional structure preferably, stored as a sparse distribution representation in a distributed database. However, other storage formats may be used. Fingerprints can be visualized as a dense vector, wherein the x-axis represents each term and the y-axis represents the occurrence of each term, as illustrated in FIG. 5. The scoring function operates within the similarity engine 104, on the plurality of co-occurrences of terms in two fingerprints, increasing the scoring value depending on the co-occurrence of terms. For a more effective comparison, the occurrence value of each term may be normalised (as described below) so that it is directly proportional to the perpendicular distance between the respective point on the plot and the x-axis, and inversely proportional to the sum of perpendicular distances between the x-axis and all points on the plot.

Figure 5A:
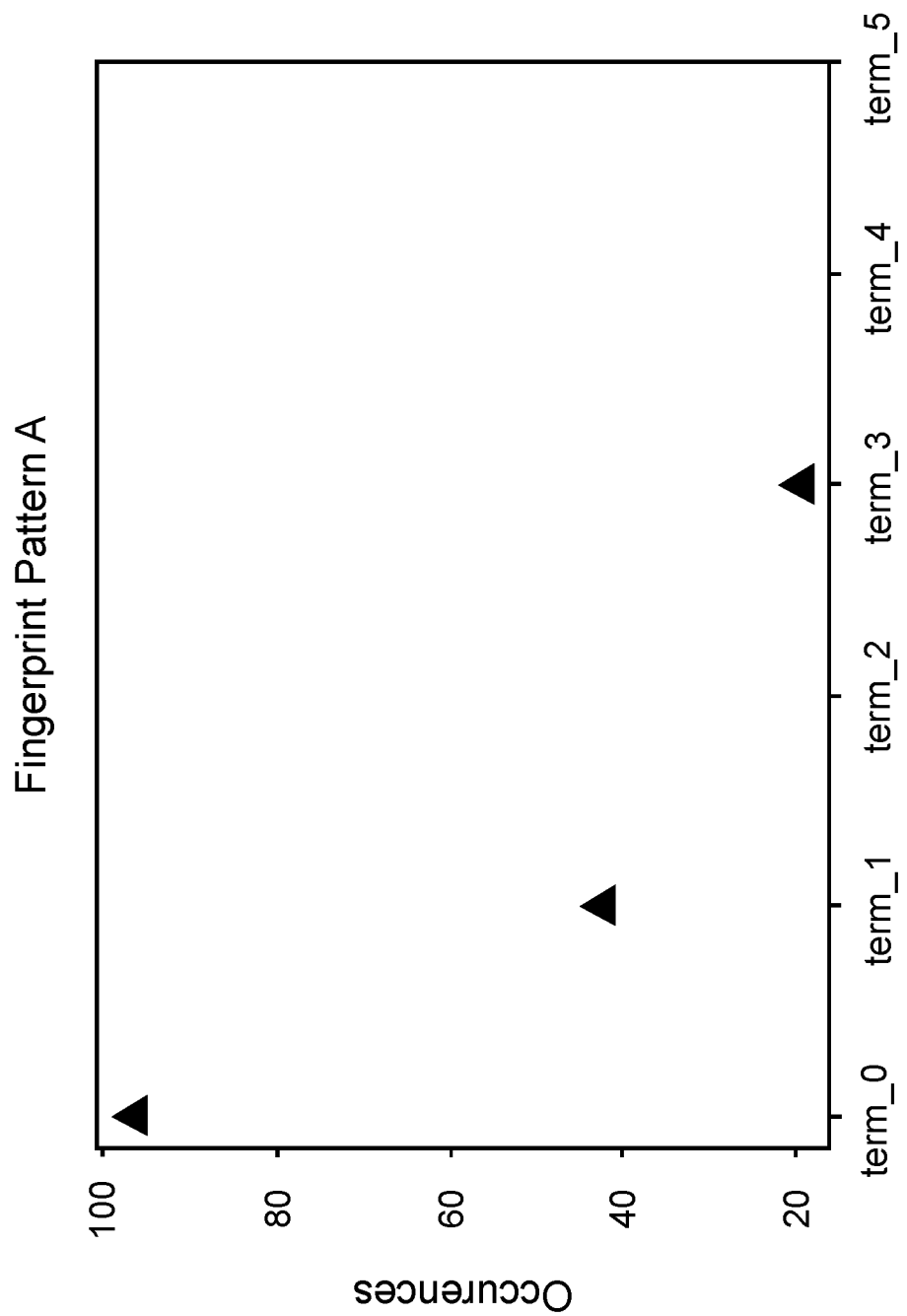
FIG. 5a shows a graphical representation of the fingerprint of a digital work.
Figure 5B:
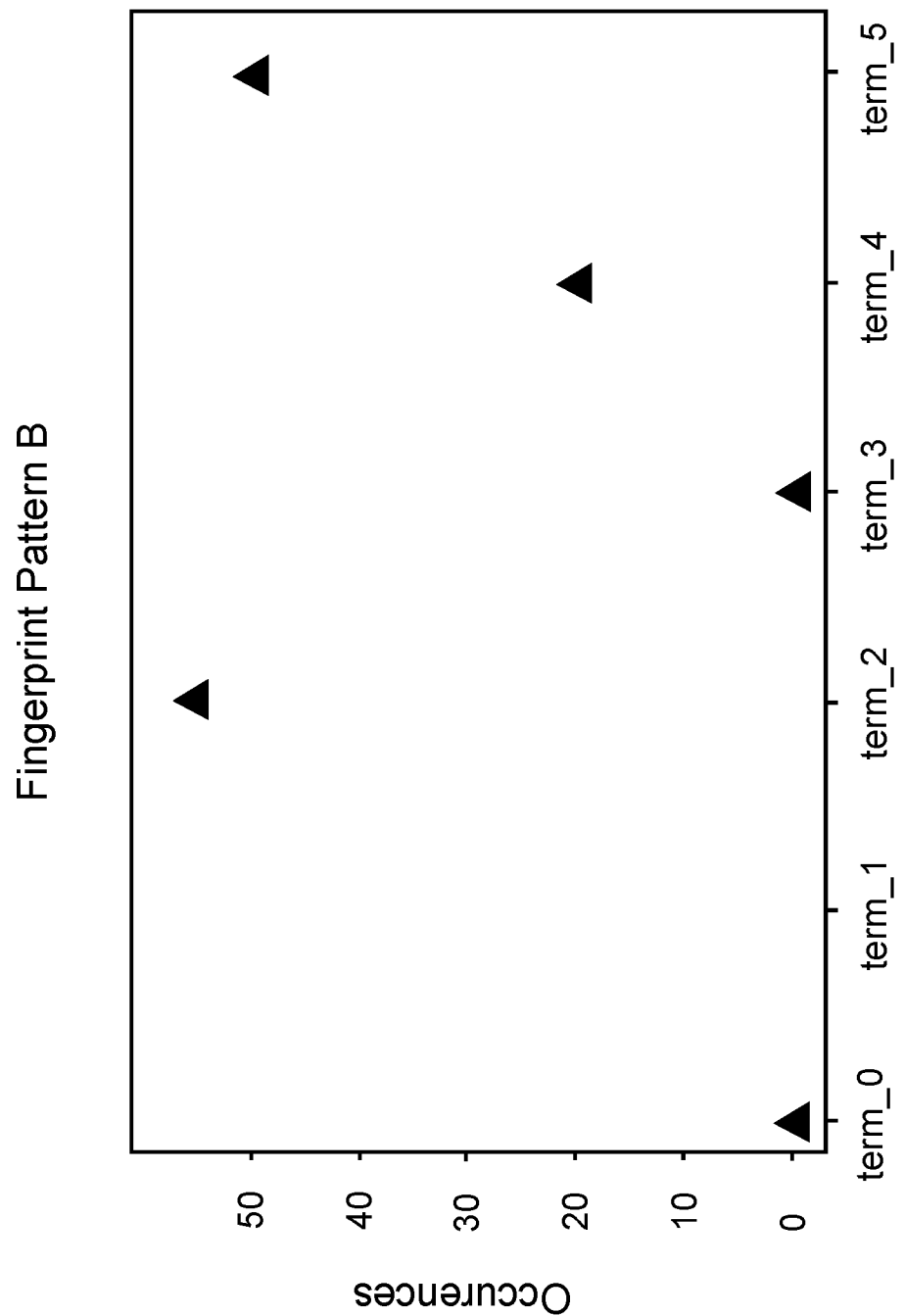
FIG. 5b shows a graphical representation of the fingerprint of a further digital work.

The scoring function may be defined as:

$$sim(f1, f2) = \sum^{|f1 \cap f2|} \frac{f1_i}{\sum_{k=1}^{N} f1_k} \frac{f2_j}{\sum_{k=1}^{N} f2_k} \quad \forall \, i \equiv j \quad (3)$$

where sim(.) is the similarity function, f1 and f2 are the fingerprints to compare, i and j are terms inside f1 and f2 respectively, |.| denotes the cardinality, and ∩ is the set intersection operator. FIGS. 5a and 5b show example fingerprint patterns.

The expectation of a score between two terms of fingerprints f1 and f2 can be evaluated as follows:

$$E[f1_i, f2_j] = \begin{cases} \text{if } i \equiv j \to \dfrac{f1_i}{\sum_{k=1}^{N} f1_k} \dfrac{f2_j}{\sum_{k=1}^{N} f2_k} \\ \text{otherwise} \to 0 \end{cases} \quad (4)$$

Therefore, the scoring method can be used when comparing fingerprints having different lengths, whilst limiting computational time and resources to matching terms.

Figure 6:
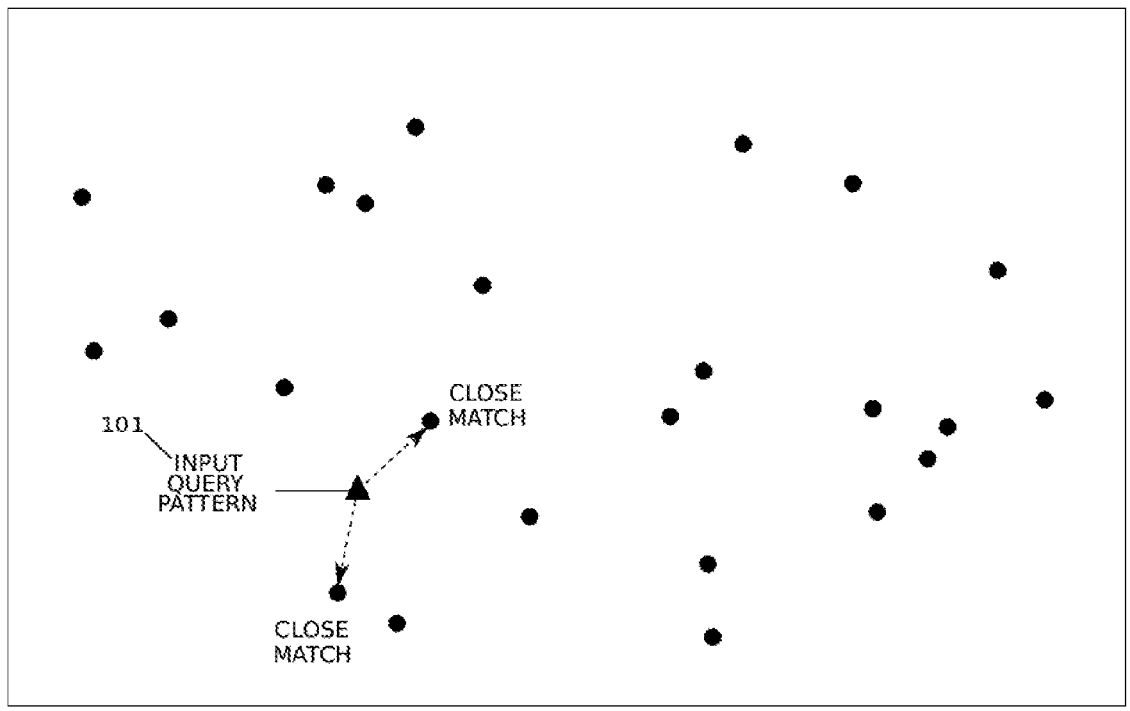
FIG. 6 shows a two dimensional representation of a method for comparing the fingerprints of digital works.

A term can also be a fingerprint, consisting of terms, forming a multidimensional space of interconnected fingerprints. In order to improve efficiency and reduce processing requirements, lower dimensionality distance space can be built to enable faster, in memory searching for fingerprints. The placement of fingerprints in this space may be based on precomputed distances between fingerprints, as dictated by the above similarity scoring function (equation 3) described above. The use of this function further reduces score calculation times. FIG. 6 provides a two-dimensional schematic representation of this distance space, as loaded in memory and processed to respond to a search query in the form of an input fingerprint. The similarity scoring function, as executed by the similarity engine 104, provides a particularly efficient and effective response to such queries in terms of accuracy and computing performance when compared to other search methods.

The following provides an example implementation of normalisation that may be applied to any or all of the fingerprints before processing further.

Consider fingerprint f1 which is comprised of three terms t1, t2, t3:

$$f1 = \{\\ t1, occurrence = 3\\ t2, occurrence = 1\\ t3, occurrence = 1\\ \}$$

Normalising the occurrences involves dividing each occurrence with the sum of occurrences (3+1+1=5) for all terms in f1. Thus:

$$f1 = \{\\ t1, normalised\ occurrence = 3/5 = 0.6\\ t2, normalised\ occurrence = 1/5 = 0.2\\ t3, normalised\ occurrence = 1/5 = 0.2\\ \}$$

In this example, plotting the terms on a graph having occurrence number as the y-axis and term as the x-axis (as shown in other example fingerprint representations in FIGS. 5a and 5b), t1 is marked at x1 point with y1 corresponding to an occurrence value of 3. The x2 point corresponds with term t2 having an occurrence value, y2, (i.e. y2=1). Similarly, t3 will be plotted at x3 and y3(=1).

The variable length between fingerprints may be solved by the use of the constraint i=j. The following provides an example implementation for fingerprint f1 and f2 of different lengths, where fingerprint f2 is defined as:

$$f2 = \{\\ t1, occurrence = 5\\ t5, occurrence = 1\\ \}$$

In this example, f2 has a length of 2 (i.e. the same as the number of terms), whereas f1 has a length of 3. Additionally, f2 does not contain t2 and t3 which are present in f1. When the similarity engine 104 applies the similarity function to the two fingerprints, only t1 is used for their comparison, since it is the only term that exists in both f1 and f2. In this way we have compared f1 and f2 which have lengths 3 and 2 respectively.

A list of possible candidate matches is collected and sorted by their similarity score. A precomputed and optimised threshold may be used to discard candidates, whose similarity score is below this threshold. This similarity threshold can vary depending the context, type of data, preferred granularity and the number of candidates. The threshold may be set using other mechanisms. All candidates (i.e. matches) whose similarity score exceed the threshold are returned to the user as recommendations or as another output format. For example, the actual digital works may be returned to the user or a link to such works.

As will be appreciated by the skilled person, details of the above embodiment may be varied without departing from the scope of the present invention, as defined by the appended claims.

For example, whilst the examples provides show a single server 210, the load may be managed over several servers. Alternatively, the system may be implemented in a virtual server or other distributed computing environment or network. Many different users may submit queries or receive recommendations. Queries may be submitted from different terminal types, such as desktop computers, mobile devices, smart phones or tablet computers, for example. In some implementations, the queries may be submitted and responses received using a mobile application. Users of such a mobile application may be presented with high level topics and may select more specific areas of interest. In this way, a query may be devises that corresponds with a search criteria fingerprint. This search may be submitted as the query and compared with other fingerprints within a repository. Matches that meet the criteria (e.g. threshold for similarity) are returned to the user. Users may be presented with the output on demand or unprompted. For example, they may select, download or read a particular article, which is fingerprinted by the system so that recommendations can be sent to the user automatically.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for processing digital works, the method comprising steps of:
   identifying terms within each digital work of a plurality of digital works, wherein the terms are words and/or phrases;
   determining a number of times that the identified terms occur within each digital work of the plurality of digital works;
   generating a fingerprint for each digital work of the plurality of digital works, the generated fingerprint based on the identified terms and the number of times that the identified terms occur within each digital work;
   using a neural network to find an encoding function, g, that encodes a higher dimensionality space, x, of each fingerprint into a lower dimensionality space, y;
   applying the encoding function to each fingerprint of the plurality of digital works to reduce the dimensionality of each fingerprint;
   determining a similarity between a first fingerprint and one or more dimensionality reduced fingerprints; and generating an output of data indicating digital works having fingerprints with a similarity to a first dimensionality reduced fingerprint exceeding a threshold, wherein the output is generated in response to receiving a query, and wherein a similarity between two or more dimensionality reduced fingerprints is determined based on a scoring function sim(.), as:

$$sim(f1, f2) = \sum^{|f1 \cap f2|} \frac{f1_i}{\sum_{k=1}^{N} f1_k} \frac{f2_j}{\sum_{k=1}^{N} f2_k} \forall\, i \equiv j$$

where f1 and f2 are dimensionality reduced fingerprints to compare and I and j are terms within the dimensionality reduced fingerprints.

2. The method of claim 1, wherein the query includes one or more terms and the first fingerprint is formed from the query.

3. The method of claim 2 further comprising the step of receiving from a user the query formed from a selection of the one or more terms.

4. The method according to claim 2 further comprising the step of applying the encoding function to the first fingerprint to reduce the dimensionality of the first fingerprint before determining the similarity between the first fingerprint and one or more dimensionality reduced fingerprints.

5. The method according to claim 1, wherein the similarity is based on a co-occurrence of terms within the dimensionality reduced fingerprints.

6. The method according to claim 1 further comprising the steps:
of receiving a new digital work; and
adding the new digital work to the plurality of digital works.

7. The method according to claim 1, wherein the encoding function, g, is found according to the function:

$g: x \rightarrow y$ by estimating an original higher dimensionality space, $\hat{x}$, by inverting the function, g, according to:

$g^{-1}: y \rightarrow \hat{x}.$

8. The method according to claim 1 further comprising the step of storing the plurality fingerprints and data identifying associated digital works in a repository.

9. The method of claim 1, wherein an expectation of a score between the two terms, i and j is evaluated according to:

$$E[f1_i, f2_j] = \begin{cases} \text{if } i \equiv j \rightarrow \dfrac{f1_i}{\sum_{k=1}^{N} f1_k} \dfrac{f2_j}{\sum_{k=1}^{N} f2_k} \\ \text{otherwise} \rightarrow 0 \end{cases}$$

10. The method of claim 1 further comprising the step of sorting fingerprints by respective similarity values, computed by the scoring function.

11. The method according to claim 1, wherein identifying terms within each digital work further comprises identifying terms based on a look up table or a dictionary or by tagging terms previous identified in previous processing.

12. The method according to claim 1 further comprising the step of limiting a number of identified terms in each digital work.

13. The method of claim 12, wherein the limited number of identified terms is a predetermined limit.

14. The method according to claim 1, wherein the digital works are any one or more of: text, documents, web pages, articles, news stories, books, newspaper content, social media content, and/or publications.

15. A data processing apparatus comprising a processor adapted to perform the steps of:
identifying terms within each digital work of a plurality of digital works, wherein the terms are words and/or phrases;
determining a number of times that the identified terms occur within each digital work of the plurality of digital works;
generating a fingerprint for each digital work of the plurality of digital works, the generated fingerprint based on the identified terms and the number of times that the identified terms occur within each digital work;
using a neural network to find an encoding function, g, that encodes a higher dimensionality space, x, of each fingerprint into a lower dimensionality space, y;
applying the encoding function to each fingerprint of the plurality of digital works to reduce the dimensionality of each fingerprint;
determining a similarity between a first fingerprint and one or more dimensionality reduced fingerprints; and
generating an output of data indicating digital works having fingerprints with a similarity to a first dimensionality reduced fingerprint exceeding a threshold, wherein the output is generated in response to receiving a query,
wherein the similarity between two or more dimensionality reduced fingerprints is determined based on a scoring function sim(.), as:

$$sim(f1, f2) = \sum^{|f1 \cap f2|} \frac{f1_i}{\sum_{k=1}^{N} f1_k} \frac{f2_j}{\sum_{k=1}^{N} f2_k} \forall\, i \equiv j$$

where f1 and f2 are dimensionality reduced fingerprints to compare and I and j are terms within the dimensionality reduced fingerprints.

16. A non-transitory computer-readable medium comprising instructions, which when executed by a computer, cause the computer to carry out the steps of:
identifying terms within each digital work of a plurality of digital works, wherein the terms are words and/or phrases;
determining a number of times that the identified terms occur within each digital work of the plurality of digital works;
generating a fingerprint for each digital work of the plurality of digital works, the generated fingerprint based on the identified terms and the number of times that the identified terms occur within each digital work;
using a neural network to find an encoding function, g, that encodes a higher dimensionality space, x, of each fingerprint into a lower dimensionality space, y;
applying the encoding function to each fingerprint of the plurality of digital works to reduce the dimensionality of each fingerprint;

determining a similarity between a first fingerprint and one or more dimensionality reduced fingerprints; and generating an output of data indicating digital works having fingerprints with a similarity to a first dimensionality reduced fingerprint exceeding a threshold, wherein the output is generated in response to receiving a query, wherein the similarity between two or more dimensionality reduced fingerprints is determined based on a scoring function sim(.), as:

$$sim(f1, f2) = \sum^{|f1 \cap f2|} \frac{f1_i}{\sum_{k=1}^{N} f1_k} \frac{f2_j}{\sum_{k=1}^{N} f2_k} \forall\, i \equiv j$$

where f1 and f2 are dimensionality reduced fingerprints to compare and I and j are terms within the dimensionality reduced fingerprints.

* * * * *